(12) United States Patent
Paik et al.

(10) Patent No.: US 9,483,825 B2
(45) Date of Patent: Nov. 1, 2016

(54) APPARATUS AND METHOD FOR ESTIMATING DISTANCE USING DUAL OFF-AXIS COLOR FILTER APERTURE

(71) Applicant: CHUNG-ANG UNIVERSITY INDUSTRY-ACADEMY COOPERATION FOUNDATION, Seoul (KR)

(72) Inventors: Joon-Ki Paik, Seoul (KR); Seung-Won Lee, Seoul (KR)

(73) Assignee: CHUNG-ANG UNIVERSITY INDUSTRY-ACADEMY COOPERATION, Seoul (KR)

( * ) Notice: Subject to any disclaimer, the term of this patent is extended or adjusted under 35 U.S.C. 154(b) by 33 days.

(21) Appl. No.: 14/495,522

(22) Filed: Sep. 24, 2014

(65) Prior Publication Data

US 2015/0348254 A1 Dec. 3, 2015

(30) Foreign Application Priority Data

Jun. 3, 2014 (KR) ........................ 10-2014-0067443

(51) Int. Cl.
*G06T 7/00* (2006.01)
*G06T 7/40* (2006.01)

(52) U.S. Cl.
CPC ............. *G06T 7/004* (2013.01); *G06T 7/0069* (2013.01); *G06T 7/408* (2013.01); *G06T 2207/10004* (2013.01); *G06T 2207/10024* (2013.01); *G06T 2207/10028* (2013.01)

(58) Field of Classification Search
CPC ..... G06T 7/004; G06T 7/0069; G06T 7/408; G06T 2207/10004; G06T 2207/10024; G06T 2207/10028
See application file for complete search history.

(56) References Cited

U.S. PATENT DOCUMENTS

2012/0093399 A1* 4/2012 Paik .................. H04N 5/23212
  382/164
2012/0113227 A1* 5/2012 Paik ..................... H04N 9/045
  348/46

(Continued)

FOREIGN PATENT DOCUMENTS

KR 1020120017438 B1 2/2012

OTHER PUBLICATIONS

Lee et al., "Distance estimation using a single computational camera with dual off-axis color filtered apertures", Sep. 24, 2013, Optics Express, vol. 21, No. 20.*
Lee et al., "Adaptive Background Generation for Automatic Detection of Initial Object Region in Multiple Color-Filter Aperture Camera-Based Surveillance System", Feb. 2012, IEEE Transactions on Consumer Electronics, vol. 58, No. 1, 104-110.*

(Continued)

*Primary Examiner* — Katrina Fujita
(74) *Attorney, Agent, or Firm* — William Park & Associates Ltd.

(57) ABSTRACT

Disclosed are an apparatus and method for estimating a distance using a dual off-axis color filter aperture (DCA). An object detection unit is configured to detect an object from an image taken by a camera having the DCA equipped with a first filter having a first color and a second filter having a second color complementary to the first color. A color shifting value calculation unit is configured to calculate a color shifting value (CSV) using a color shift property between color channels of the image in a region corresponding to the detected object. A distance estimation unit is configured to estimate a distance from the camera to each point of the object based on the calculated CSV and camera parameters including a focal distance of the camera, a focal plane of the camera, and a position of the aperture.

17 Claims, 11 Drawing Sheets
(2 of 11 Drawing Sheet(s) Filed in Color)

(56) References Cited

U.S. PATENT DOCUMENTS

2012/0189195 A1* 7/2012 Paik .................. H04N 5/23212
  382/164
2015/0029312 A1* 1/2015 Paik .................... H04N 5/2254
  348/46

OTHER PUBLICATIONS

Lee et al., "Color Shift Model-Based Image Enhancement for Digital Multifocusing Based on a Multiple Color-Filter Aperture Camera", 2010, IEEE Transactions on Consumer Electronics, vol. 56, No. 2, 317-323.*

* cited by examiner (a)

(b)

(a)

(b)

(a)

(b)

(a)

(b)

APPARATUS AND METHOD FOR ESTIMATING DISTANCE USING DUAL OFF-AXIS COLOR FILTER APERTURE

CROSS-REFERENCE TO RELATED APPLICATION

This application claims priority to and the benefit of Korean Patent Application No. 10-2014-0067443, filed on Jun. 3, 2014, the disclosure of which is incorporated herein by reference in its entirety.

BACKGROUND

1. Field of the Invention

The present invention relates to an apparatus and method for estimating a distance using a dual off-axis color filter aperture (DCA), and more particularly, to an apparatus and method for estimating a distance from a camera to a subject using a DCA.

2. Discussion of Related Art

In the computer vision field, object detection is widely used in an intelligence monitoring system, a robot vision, a driving monitoring, and the like. A two-dimensional (2D) image extracted by a camera has many difficulties in controlling an autonomous mobile robot in a robot vision or an overlap between objects in an intelligence monitoring system. To overcome these difficulties, research is being conducted to extract three-dimensional information from an image.

Stereoscopic vision that has been studied for tens of years obtains distance information by performing matching between two images that are acquired from two cameras. Since this method acquires two images simultaneously and performs matching between the images, the amount of information may increase, calculation complexity may increase, and an error may be amplified during a disparity calculation process.

Recently, various calculation cameras for acquiring additional information from images using optical characteristics and image processing have been developed. With such additional information acquired from optical characteristics of a camera, a limitation of stereo cameras may be overcome using various methods, such as refocusing, increasing a dynamic range, and depth-induced editing. However, the above-described methods may have a lot of calculations or cannot accurately estimate a distance from a camera to a subject.

REFERENCE DOCUMENTS (Patent document 1) Korean Patent No. 10-1216668 entitled "Apparatus and Method for Estimating Object Information of Image Taken by Multiple Color Filter Aperture Camera" discloses an apparatus and method for estimating object information of an image taken by a camera having a multiple color filter aperture.

(Patent document 2) Korean Patent No. 10-1290197 entitled "Apparatus and Method for Estimating Depth Information of Image" discloses an apparatus and method for calculating a motion vector of each color channel of an image taken using a camera having a multiple color filter aperture and estimating a distance from a camera to an object on the basis of the calculated motion vector.

SUMMARY OF THE INVENTION

The present invention is directed to an apparatus and method for estimating a distance from a camera to respective objects from an image taken using a dual off-axis color filter aperture (DCA), with simple calculation.

The present invention is also directed to a computer-readable recording medium recording a program for executing a method for estimating a distance from a camera to respective objects from an image taken using a dual off-axis color filter aperture (DCA) with simple calculation.

According to an aspect of the present invention, there is provided an apparatus for estimating a distance using a dual off-axis color filter aperture (DCA), the apparatus including: an object detection unit configured to detect an object from an image taken by a camera having the DCA equipped with a first filter having a first color and a second filter having a second color complementary to the first color using a predetermined method; a color shifting value calculation unit configured to calculate a color shifting value (CSV) using a color shift property between color channels of the image in a region corresponding to the detected object; and a distance estimation unit configured to estimate a distance from the camera to each point of the object based on the calculated CSV and camera parameters including a focal distance of the camera, a focal plane of the camera, and a positions of the aperture.

According to another aspect of the present invention, there is provided a method of estimating a distance using a dual off-axis color filter aperture (DCA), the method including: detecting an object from an image taken by a camera having the DCA equipped with a first filter having a first color and a second filter having a second color complementary to the first color using a predetermined method; calculating a color shifting value (CSV) using a color shift property between color channels of the image in a region corresponding to the detected object; and estimating a distance from the camera to each point of the object based on the calculated CSV and camera parameters including a focal distance of the camera, a focal plane of the camera, and a position of the aperture.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Hereinafter, an apparatus and method for estimating a distance using a dual off-axis color filter aperture according to an embodiment of the present invention will be described in detail with reference to the accompanying drawings.

Figure 1:
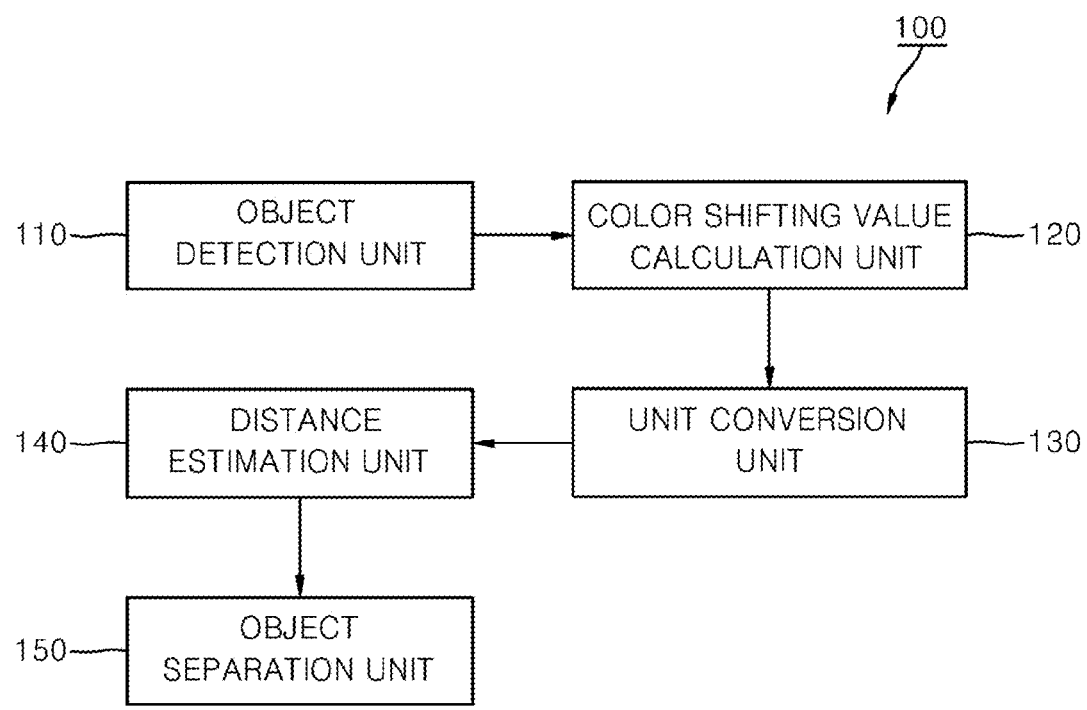
FIG. 1 is a block diagram showing a configuration of an apparatus 100 for estimating a distance using a dual off-axis color filter aperture (DCA) according to an embodiment of the present invention.

FIG. 1 is a block diagram showing a configuration of an apparatus 100 for estimating a distance using a dual off-axis color filter aperture (DCA) according to an embodiment of the present invention.

Referring to FIG. 1, the apparatus 100 for estimating a distance using a dual off-axis color filter aperture (DCA) according to an embodiment of the present invention includes an object detection unit 110, a color shifting value calculation unit 120, a unit conversion unit 130, a distance estimation unit 140, and a object division unit 150.

The object detection unit 110 detects an object from an image taken by a camera (hereinafter, referred to as a DCA camera) including a DCA equipped with a filter having a first color and a filter having a second color complementary to the first color. In this case, the object detection method may include, but is not limited to, an optical flow technique, an edge detection technique, and the like. A method well known to a person skilled in the art may be used to detect an object in an embodiment of the present invention. Accordingly, the description thereof will be omitted. Preferably, the first color may be red, and the second color may be cyan.

The color shifting value calculation unit 120 calculates respective color shifting values of color channels corresponding to the first color and the second color with respect to the detected object.

Figure 2:
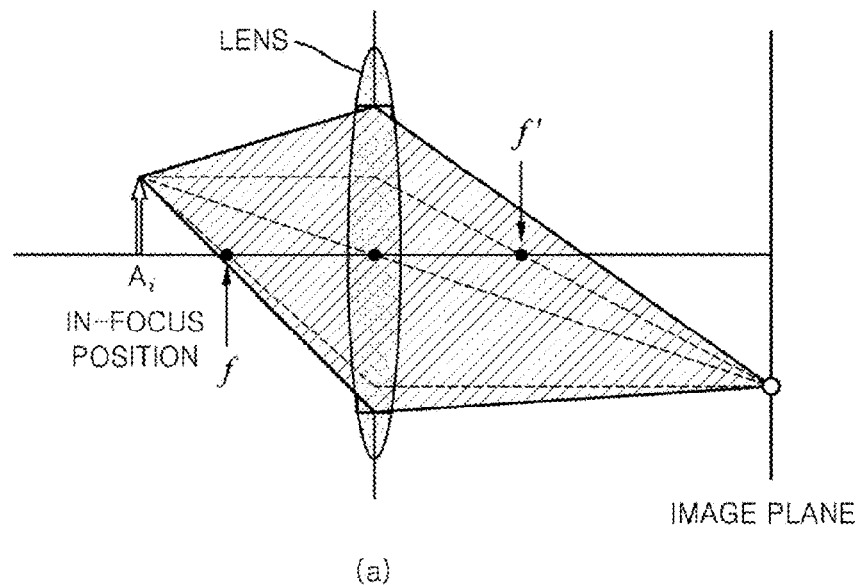
FIG. 2 is a view showing a general imaging system using a thin-type lens having an aperture arranged in an optical axis.
Figure 2:
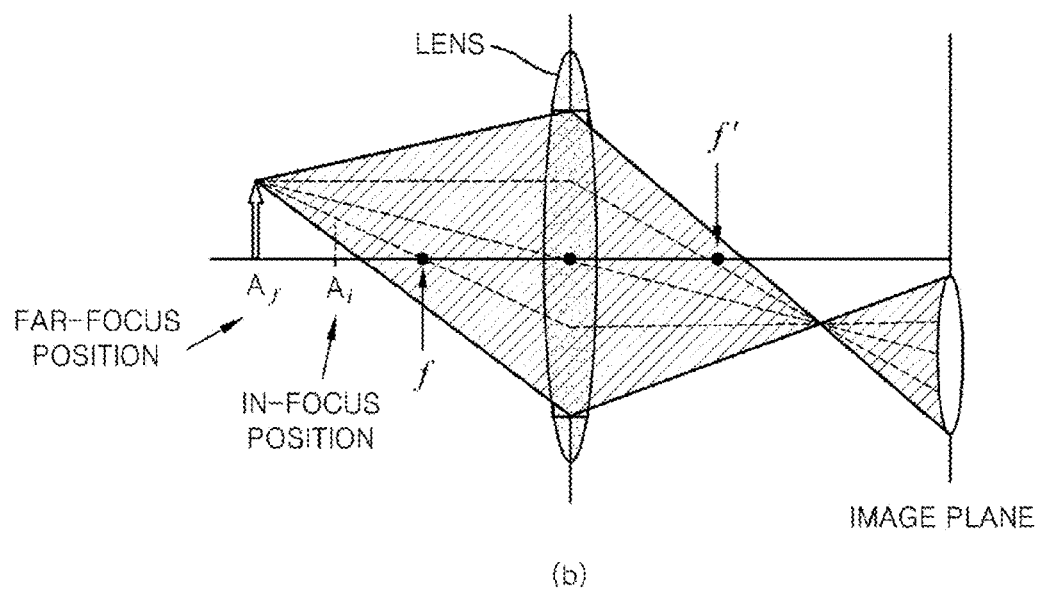

An aperture used in an optical system is a device for controlling a size of an opening of a camera to control an amount of light that is incident on an image sensor. In a general image system, a center of the aperture is aligned with a center of an optical axis. Referring to (a) of FIG. 2, a convergence pattern of an object that is positioned in focus in an image is formed as one point. However, as shown in (b) of FIG. 2, when the object is moved from an in-focus position (Ai) to a far-focus position (Af), a point of the object is spread in an image plane to form a circle of confusion (COC).

Figure 3:
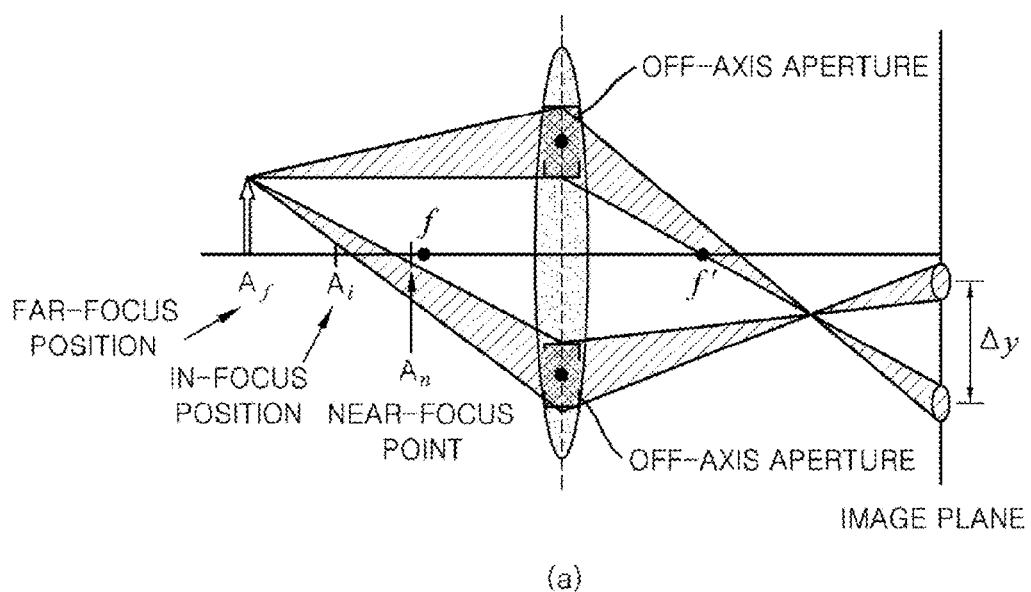
FIG. 3 is a view showing an optical system having two off-axis apertures.
Figure 3:
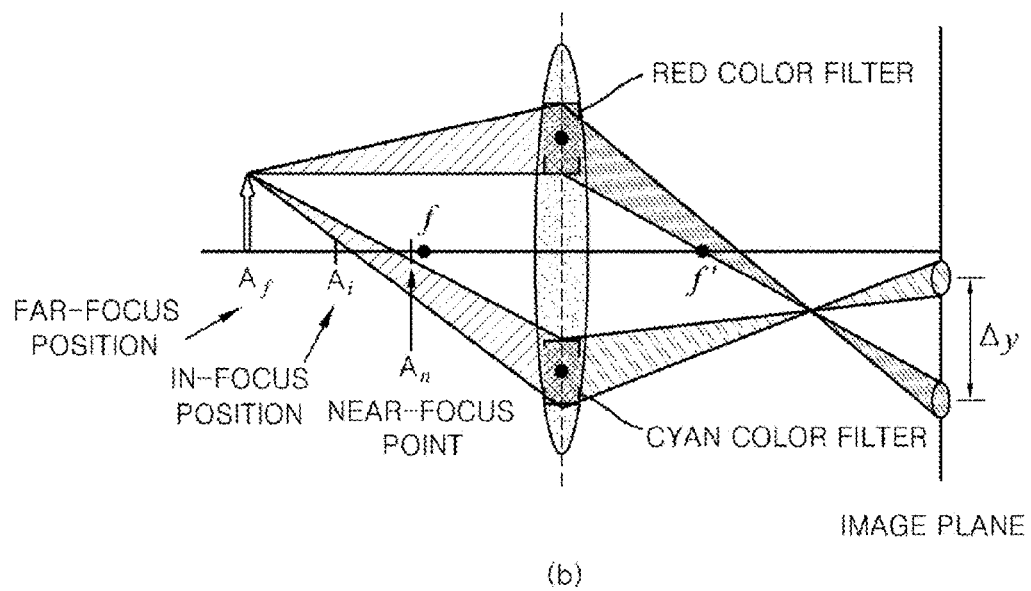

As shown in (a) of FIG. 3, if a dual off-axis color filter aperture (DCA) is formed by blocking a center of the aperture, a movement pattern occurs by projecting one point to two points that are separated from each other when the object is not positioned in the in-focus point. If the object is moved from the far-focus position (Af) to the in-focus position (Ai), two projection points are gradually converged into one point on an image plane. In addition, when the object is moved to a near-focus position (An), the one point is separated back into the two projection points in a direction opposite to the above-described direction.

As shown in (b) of FIG. 3, the DCA may measure disparity between the two projection points to estimate a distance between the object and the camera since a red projection point and a cyan (green and blue) projection point are separately formed on an image plane according to the distance between the object and the camera when a red color filter and a cyan color filter are provided to respective openings. A distance between two separated convergence patterns is determined according to the distance between the object and the camera. Accordingly, the red color filter is equipped in one aperture of a lens and the cyan color filter is equipped in the other aperture. Thus the two convergence patterns may be separately acquired by a red sensor and a cyan sensor. A functional relation between a disparity obtained from the two red and cyan points and an object distance may be geometrically induced, and the geometric disparity may be estimated from a color deviation value between the two projection points.

The color shifting value calculation unit 120 calculates color shifting values (CSVs) of a first color channel and a second color channel corresponding to the first color and the second color, respectively, using characteristics of the DCA. An image sensor of the DCA camera provides geometrical information such as color shifting between color channels according to a distance in addition to color and intensity information. When an object is positioned at an in-focus position, objects on an image plane are converged and thus a color shift is not generated. However, when the object is far from the in-focus position, a color shift between a red color channel and a green or blue color channel is generated. On the contrary, when the object is close to the in-focus point, the color shifting is generated in an opposite direction to the far-focus point. Thus, a distance of an object may be estimated from a single image of a single sensor camera using the CSV estimated through the convergence pattern.

In order to estimate the CSV between red and green (R-G) or between red and blue (R-B) in an image acquired from the DCA camera, the present invention uses a $L_1$ norm minimization method of an energy function for depth estimation. An early optical flow algorithm assumes brightness constancy in finding motion between adjacent images. However, since the image acquired from the DCA camera has different intensities in respective color channels, the characteristic of brightness constancy between three channels is not satisfied. Accordingly, an embodiment of the present invention uses an optical flow estimation algorithm that includes a data term considering gradient consistency in addition to the brightness consistency. In order to adapt this function to an image of the DCA camera to which the optical flow estimation algorithm that performs estimation along only an x-axis has been applied, an energy function for an R(red)-G(green) data term is defined as the following equation (1).

$$E_{data}^{rg}(s) = \int_\Omega \psi(|I^r(x+s,y) - I^g(x,y)|^2)dxdy + \int_\Omega \psi(|I_x^r(x+s,y) - I_x^g(x,y)|^2)dxdy \quad \text{[Equation 1]}$$

Where, $E_{data}^{rg}$ denotes an energy function for a red (R) and green (G) data term, s denotes a channel shifting value (CSV) between a red channel and a green channel, $\Omega$ denotes any region in an image, $\psi$ denotes a concave function, $I^r(x)$ and $I^g(x)$ denote R (red) and G (green) color channel images, respectively, and $I_x^r(x)$ and $I_x^g(x)$ denote partial derivatives of the R (red) and G (green) color channels with respect to x. In this case, a modified $L_1$ norm minimization method of energy is induced using $\psi(s^2) = \sqrt{s^2 + \epsilon^2}$ (here, $\epsilon$ is a small constant and $\epsilon = 0.001$). The modified $L_1$ norm minimization method is used to solve an outlier problem that occurs at a boundary of a discrete signal.

The definition of an energy function $E_{data}^{rb}(u)$ for red (R) and blue (B) data terms may be obtained by substituting $I^g(x)$ with $I^b(x)$ in equation (1). In addition, since a CSV between R and G and a CSV between R and B have the same disparity, the two data terms may be considered as one term.

A piecewise smoothness constraint is applied including a penalty term defined as shown in equation (2).

$$E_{smooth}(s) = \int_\Omega \psi(s_x(x,y)^2 + s_y(x,y)^2)dxdy \quad \text{[Equation 2]}$$

Where, $s_x$ and $s_y$ denote partial derivatives of a color shift map with respect to x and y. Accordingly, a total energy function is a sum of weights among the two data terms and the smoothness term and is defined as the following equation (3).

$$E(s) = E_{data}^{rt}(s) + E_{data}^{rb}(s) + \alpha E_{smooth}(s) \quad \text{[Equation 3]}$$

Figure 5:
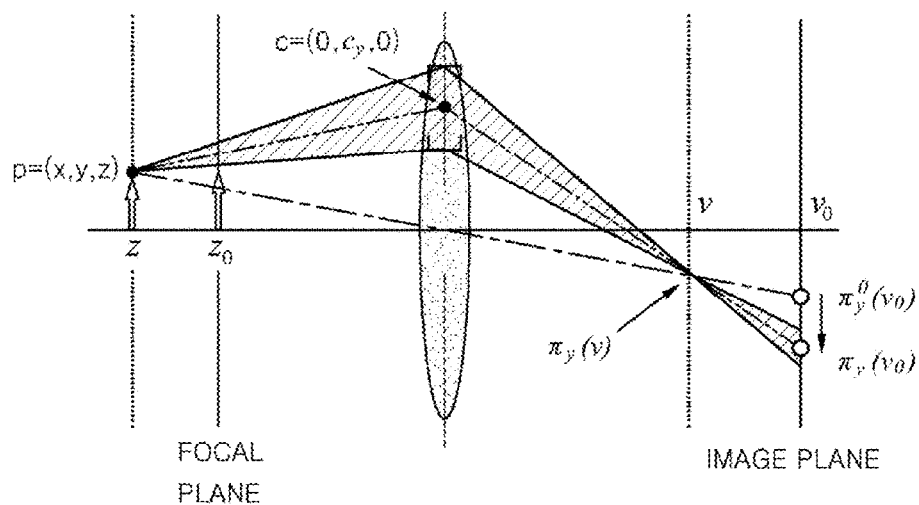
FIG. 5 is a view showing an image forming principle using one off-axis aperture.

Where, $\alpha$ is a regulation parameter and $\alpha > 0$. A CSV may be estimated by minimizing E which is the total energy function. A result of a CSV that is estimated using the modified optical flow method is shown in FIG. 5.

In order to detect an object from an image acquired by the DCA camera, an adaptive background modeling method is used. At a first stage, a motion vector is estimated using the optical flow method. $I_t(x,y)$ and $I_{t-1}(x,y)$ are taken as a current frame and a previous frame, respectively, and an optical flow of each pixel (x,y) may be obtained by minimizing a Euclidean distance, as shown in equation (4) below.

$$F(x,y) = \sum_{i=x-w}^{x+w} \sum_{j=y-w}^{y+w} (I_t(i,j) - I_{t-1}(i+d_x, j+d_y))^2 \quad \text{[Equation 4]}$$

Where, $(d_x, d_y)$ that minimizes F(x,y) denotes a displacement of a pixel (x,y). When $F(x,y) < T_F$ (here $T_F$ is a threshold that is previously specified in the Euclidean distance), the pixel (x,y) is assumed to be in a background, and a background image is updated corresponding to a defined pixel as shown in equation (5) below.

$$B_t(x,y) = (1-\beta)I_t(x,y) + \beta B_{t-1}(x,y) \quad \text{[Equation 5]}$$

Where, $B_t$ and $B_{t-1}$ are background images at time t and time t−1, respectively, and $\beta$ is a mixing ratio in a range [0, 1].

Figure 4:
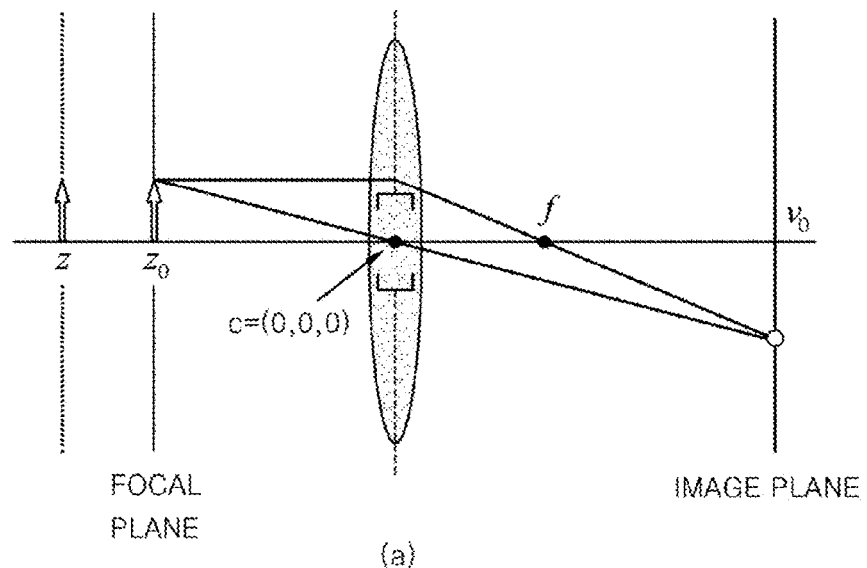
FIG. 4 is a view showing an image forming principle of a general thin-type lens.
Figure 4:
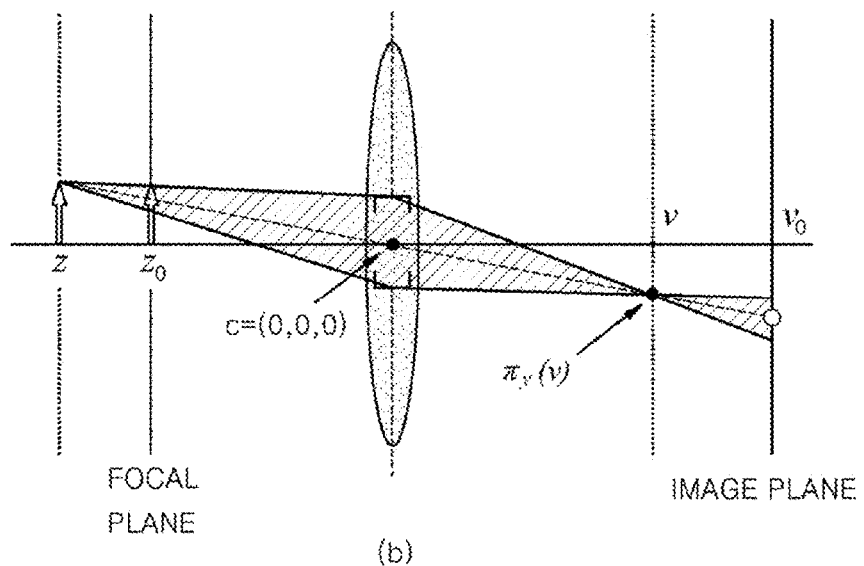

FIG. 4 shows an image forming principle using a general lens. A case in which an object is positioned in a focal plane is shown in (a) of FIG. 4, and a case in which an object is positioned at a point far from the focal plane is shown in (b) of FIG. 4.

Referring to FIG. 4, if a center c of a lens having a focal distance f positioned on an optical axis is (0,0,0) and an image plane of a camera is separated from the center of the lens by $v_0$, then a distance from the center of the lens to a focal plane $z_0$ using the Gauss lens equation may be obtained by the following equation.

$$\frac{1}{v_0} + \frac{1}{z_0} = \frac{1}{f} \quad \text{[Equation 6]}$$

Accordingly, the distance from the center of the lens to the object is obtained by the following equation as shown in (a) of FIG. 4.

$$z_0 = f \frac{v_0}{v_0 - f} \quad \text{[Equation 7]}$$

Similarly, when the object is separated by z from the center of the lens, the image plane v is at a distance calculated by the following equation, that is, at an in-focus point.

$$v = f \frac{z}{z - f} \quad \text{[Equation 8]}$$

However, when the image plane is positioned at $v_0$, as shown in (b) of FIG. 4, the object is blurred, and a diameter of a blurred area is calculated by the following equation.

$$b = d \frac{f}{z_0} \frac{Cz - z_0 C}{Cz - fC} \quad \text{[Equation 9]}$$

Where, b is a diameter of a blurred area, d is a diameter of an aperture, f is a focal distance of a lens, $z_0$ is a distance from a center of a lens to a focal plane, and z is a distance from a center of a lens to an object.

FIG. 5 shows an image forming principle using a lens equipped with an off-axis aperture.

Referring to FIG. 5, the center of the aperture is positioned at $(0, c_y, 0)$ that is separated from the center of the lens. When the center of the aperture is positioned on an optical axis, light passing through the center of the aperture from the point p is projected at a point $\pi^0_y(v_0)$ on an image plane through a point $\pi_y(v)$. However, when the aperture is moved to $c=(0, c_y, 0)$, light moves from a point $\pi^0_y(v_0)$ on the image plane to a point $\pi_y(v_0)$. A shifting value of the point is determined by $c_y$. A position $\pi_y(v_0)$ where light is projected may be obtained by the following equation.

$$\frac{c_y - \pi_y(v)}{v} = \frac{\pi_y(v) - \pi_y(v_0)}{v_0 - v} \quad \text{[Equation 10]}$$

When equation (10) is solved with respect to $\pi_y(v_0)$, the following equation is obtained.

$$\pi_y(v_0) = \frac{v_0}{v}\pi_y(v) + \left(1 - \frac{v_0}{v}\right)c_y \quad \text{[Equation 11]}$$

Since $$\pi_y(v) = -\frac{y}{z}v$$

in equation (11), thus, equation (11) is summarized as the following equation.

$$\pi_y(v_0) = -\frac{y}{z}v_0 + \left(1 - \frac{v_0}{v}\right)c_y \quad \text{[Equation 12]}$$

Equation (12) is a projection location of a point p in a y-axis direction when the center of the aperture is positioned at $(0, c_y, 0)$.

Figure 6:
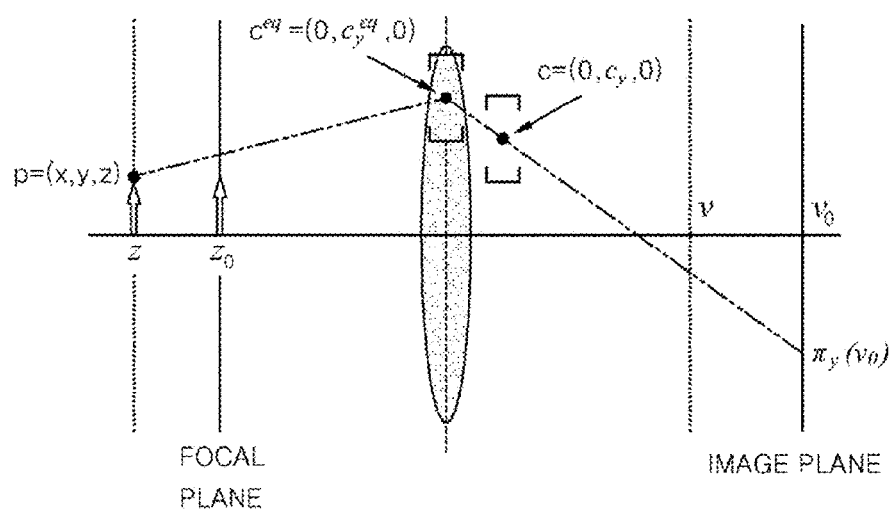
FIG. 6 is a view showing an imaging system having one off-axis aperture.

In an actual imaging system, as shown in FIG. 6, the aperture is not on the plane of the lens and is positioned at a position separated from the lens by a certain distance $c_z$. As the off-axis aperture is moved from the lens, an equivalent position $c^{eq}_y$ of the aperture is represented by a position function of a point p as shown in the following equation.

$$\frac{c^{eq}_y - \pi_y(v_0)}{v_0} = \frac{c_y - \pi_y(v_0)}{v_0 - c_z} \quad \text{[Equation 13]}$$

When equation (13) is solved with respect to $c^{eq}_y$, the following equation is obtained.

$$c^{eq}_y = \frac{c_y v_0 - c_z \pi_y(v_0)}{v_0 c_z} \quad \text{[Equation 14]}$$

When $c_y$ in equation (12) is substituted with $c^{eq}_y$ in equation 14 and solving for $\pi_y(v_0)$, the following equation is obtained.

$$\pi_y(v_0) = -v\frac{y}{z}\left(\frac{v_o - c_z}{v - c_z}\right) + \frac{v - v_0}{v - c_z}c_y \quad \text{[Equation 15]}$$

Equation (15) is a general expression for a y-axis of a projection of a point $p=(x, y, z)$ on an image plane that is separated by $v_0$ from a center of a lens with respect to an aperture having a center positioned at $c=(0, c_y, c_t)$. With symmetry, when the center of the aperture is positioned at $c=(c_x, 0, c_z)$, the general expression for a y-axis of projection of a point $p=(x, y, z)$ is equal to the following equation.

$$\pi_x(v_0) = -v\frac{x}{z}\left(\frac{v_o - c_z}{v - c_z}\right) + \frac{v - v_0}{v - c_z}c_x \quad \text{[Equation 16]}$$

In a special case, when $p=(x, y, z_0)$, that is, the point p is positioned on a focal plane, $v=v_0$, the projection on a center c of any aperture is defined as the following equation, which is the same as the equation for the general aperture described with reference to FIG. 4.

$$\pi(p) = -\frac{v_0}{z}(x, y) \quad \text{[Equation 17]}$$

However, when the point p is not positioned on the focal plane, the position of the projection point is a function for a position of an aperture. Furthermore, the point p forms a blurred area having a diameter given by equation (7) around a projection point $\pi(p)$.

If it is assumed that the first color filter is positioned at $c_1=(c_x, c_y, c_z)$ and the second color filter is positioned at $c_2=(c_x, c_y+\Delta c_y, c_z)$ that is moved by $\Delta y$ along a y-axis, the point p is separated by $\Delta y$ along the y-axis as shown in the following equation when the point p is projected on an image plane through the two color filters, from equation (15).

$$\Delta y = \frac{v - v_0}{v - c_z}\Delta c_y \quad \text{[Equation 18]}$$

When the point p is positioned on the focal plane, $v=v_0$ and $\Delta y=0$. However, if $z>z_0$, that is, the point p is positioned farther than the focal plane, then $v<v_0$ and $\Delta y<0$. On the contrary, if $z<z_0$, that is, the point p is positioned closer than the focal plane, then $v>v_0$ and $\Delta y>0$.

On the other hand, $$v_0 = \frac{fz_0}{z_0 - f} \text{ and } v = \frac{fz}{z - f},$$

and thus equation (18) is summarized as the following equation through substitution.

$$\Delta y = f^2 \frac{z_0 - z}{(z_0 - f)(fz - (z - f)c_z)}\Delta c_y \quad \text{[Equation 19]}$$

Equation (19) represents a shifting value between projection points by a DCA in which respective apertures equipped with color filters having different colors are separated by $\Delta c_y$.

As a result, the color shifting value calculation unit 120 calculates a displacement (that is, a color shifting value) between projection points on the image plane corresponding to the two color channels of the $p=(x, y, z)$ that are caused by the DCA, using equation (19).

The unit conversion unit 130 converts a unit of the displacement between the projection points that is calculated by the color shifting value calculation unit 120. Since $c_z$, z, and $z_0$ are in units of millimeters, the displacement between projection points calculated by the color shifting value calculation unit 120 is also in units of millimeters. The color channel shifting value is in units of pixels, the units of $\Delta y$ need to be converted from millimeters to pixels. A specification of an image sensor used in a camera is needed for the unit conversion. To this, specification information of the image sensor used in the image sensor is previously stored in the unit conversion unit 130 or provided from the outside. Accordingly, for a camera including an $N_1 \times N_2$ pixel array and a CMOS array having a size of W×H mm, a distance α between the two pixels is obtained by the following equation.

$$\alpha = \sqrt{\frac{W_s H}{N_1 s N_2}}$$ [Equation 20]

In equation (20), the unit of α is mm.

For example, for a 12 megapixels (4272×2848 pixels) camera having an APS-C sensor (22.2×14.8 mm), the calculated distance α between the two pixels is 0.0052 mm.

Accordingly, when the right side of equation (19) is divided by a, a color channel shifting value Δy may be obtained in units of pixels, as shown in the following equation.

$$\Delta y = \frac{f^2}{\alpha} \frac{z_0 - z}{(z_0 - f)(fz - (z - f)c_2)} \Delta c_y$$ [Equation 21]

Figure 7:
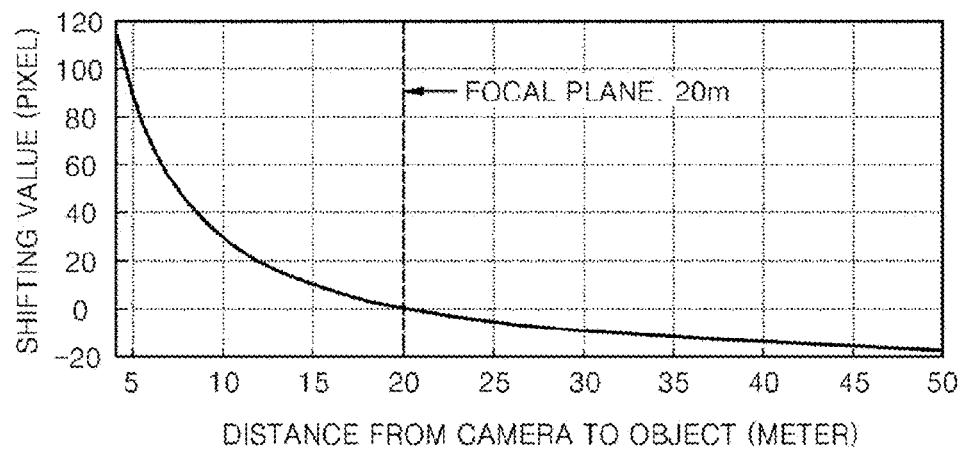
FIG. 7 is a graph showing a change in a color channel movement value $\Delta y$ with respect to z for a 150 mm lens.

FIG. 7 is a graph showing a change in a color channel shifting value Δy with respect to z for a 150 mm lens when a distance from the center of the lens to a focal plane is 20 m, a distance $\Delta c_y$ between apertures is 20 mm, and a distance $c_z$ from the center of the lens to an aperture in a z-axis direction is 0 m. Referring to FIG. 7, it can be seen that the variation Δy of the color channel shifting value with respect to z increases significantly as the object approaches the lens.

The distance estimation unit 140 estimates a distance from a camera to each point of the object on the basis of a color shifting value Δy caused by the DCA and camera parameters including a focal distance of the camera, positions of the apertures, and a focal plane of the camera.

Figure 8:
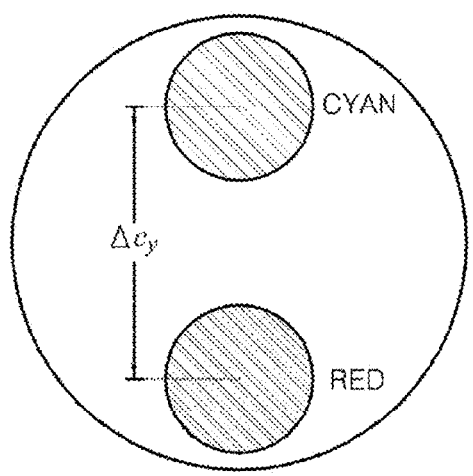
FIG. 8 is a view showing a geometric structure of a DCA camera.

The shifting value caused by projection of a point passing through two apertures that are separated by Δy in a y-axis direction is obtained from equation (19). FIG. 8 shows a geometric structure of a DCA camera. Referring to FIG. 8, a red color filter and a cyan color filter are separated by $\Delta c_y$. When a digital camera equipped with a Bayer color filter array is used, a red plane image is formed by light passing through an aperture equipped with a red color filter while a green plane image is formed by light passing through an aperture equipped with a green color filter. Due to a change between the two apertures, objects deviated from the focal plane of the camera are moved by Δy between a red plane and a green plane and between a red plane and a blue plane. Accordingly, there are correspondences of points between the red plane and the green plane or between the red plane and the blue plane, and the correspondences may be used to estimate a distance between objects in a scene. More specifically, when equation (21) is solved with respect to z, the following equation is obtained.

$$z = f \frac{fz_0 \Delta c_y - \alpha c_z (z_0 - f) \Delta y}{f^2 \Delta c_y + \alpha (z_0 - f)(f - c_z) \Delta y}$$ [Equation 22]

Accordingly, a distance z from a camera to a point p=(x, y, z) on an object may be obtained from a color shifting value Δy by a DCA in addition to camera parameters including a focal distance of the camera, positions of the apertures, and a focal plane of the camera. A method of acquiring values of the camera parameters will be described below.

Before a distance of an object from a shifting value Δy is estimated by equation (22), camera parameters, such as a focal distance f of a camera, a conversion coefficient α in conversion of a shifting value in units of millimeters into a shifting value in units of pixels, a distance $\Delta c_y$ from a center of a lens to an aperture in a z-axis direction, positions $c_z$ of apertures in a z-axis direction, and a focal plane $z_0$, need to be determined. The focal distance f may be seen from a lens specification. If a zoom lens is used, an additional adjustment procedure is needed. The conversion coefficient α may be derived from a specification of an image sensor. The positions $c_z$ of apertures in a z-axis direction are obtained through the following simple adjustment process. It is assumed that two objects are positioned at known distances $z_0$ and $z_1$ from a camera. The camera is focused on an object positioned at $z_0$, and the focal plane is set to a known value $z_0$. Next, when a shifting value Δy for an object positioned at $z_1$ is obtained and equation (22) is solved with respect to $c_z$, the following equation may be obtained.

$$c_z = f \frac{z_1(z_0 - f)\Delta y - f(z_0 - z_1)\Delta c_y}{z_1(z_0 - f)\Delta y}$$ [Equation 23]

The distance $\Delta c_y$ between the two apertures, which is a final aperture parameter, may be obtained by a simple physical measurement or an additional adjustment process. The remaining variable needed to obtain a distance z from a shifting value Δy is the focal plane $z_0$. One method for this is to setting a camera focal point to infinity or a very large value. When $z_0 \gg 0$, equation (22) may be approximated to the following equation.

$$z \approx \frac{f}{\alpha} \frac{f \Delta c_y - \alpha c_z \Delta y}{(f - c_z) \Delta y}$$ [Equation 24]

Another approximation method is to set a focal plane to an object or a point positioned at a known distance $z_0$ from a camera.

Equation (22) may be used to obtain a distance of an object from a shifting value Δy between two projection points that are generated by the DCA. In order to determine a resolution of such an estimate, Δy is partially differentiated with respect to z, as shown in the following equation.

$$\frac{d}{dz}\Delta y = \frac{f^2}{\alpha(z_0 - f)} \frac{c_z(z_0 - f) - fz_0}{[fz - (z - f)c_z]^2} \Delta c_y$$ [Equation 25]

$$\frac{d}{dz}\Delta y$$

is the number of pixels where points projected when the point p moves on the object move on an image plane in units of millimeters. Accordingly, as shown in the following equation, the resolution may be defined as a magnitude of the inverse of the partial derivative.

$$R(z, \Delta c_y) = \left| \frac{d}{dz}\Delta y \right|^{-1} = \frac{\alpha |z_0 - f|}{f^2} \frac{[fz - (z - f)c_z]^2}{|x_z(z_0 - f) - fz_0|} \frac{1}{\Delta c_y}$$ [Equation 26]

R(z, Δc$_y$) is a distance by which the object needs to move in order to change one pixel at Δy. When z$_0$>>0 and z>>f, the resolution defined in equation (26) may be approximated to the following equation.

$$R(z, \Delta c_y) \approx \alpha \frac{z^2}{f^2} \frac{|f - c_z|}{\Delta c_y} \quad \text{[Equation 27]}$$

Figure 9:
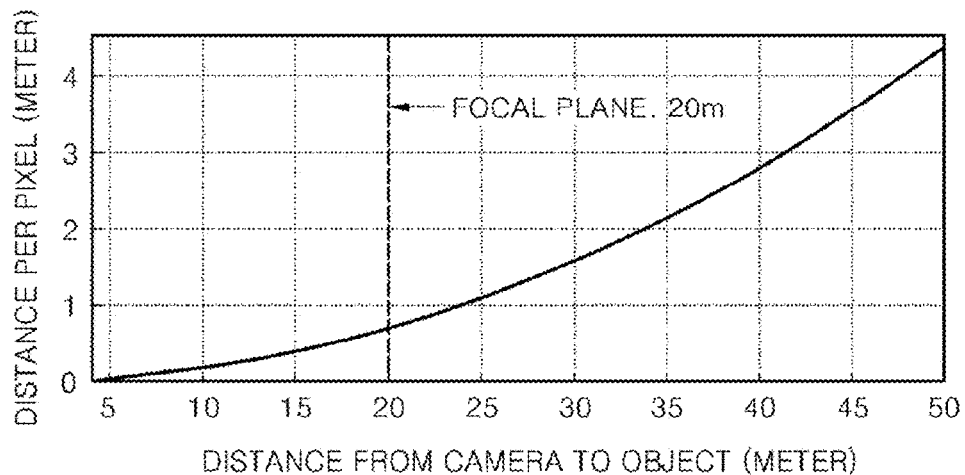
FIG. 9 is a graph showing a resolution R with respect to z and a graph showing accuracy of distance estimation using a percentage of distance.
Figure 9:
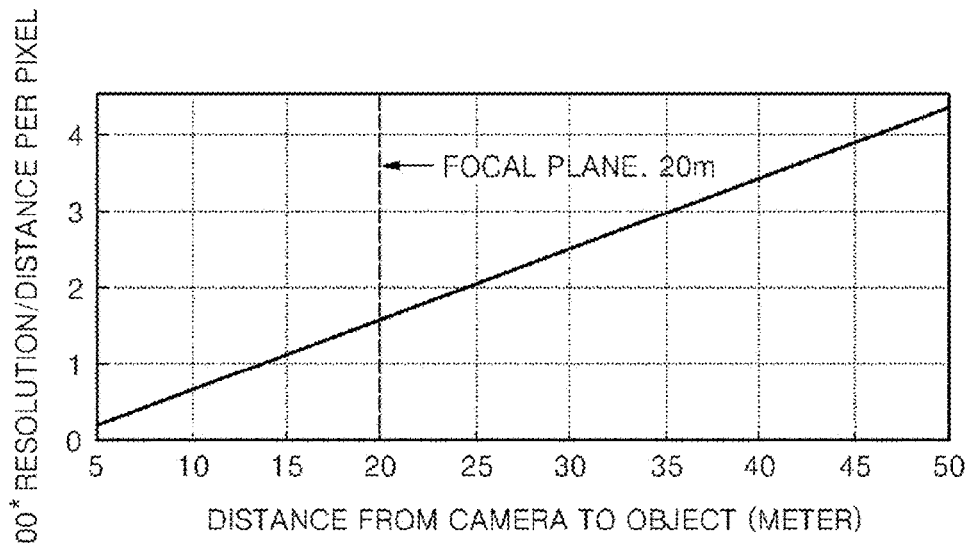

As the distance of the object increases, the resolution decreases. Accordingly, in order to maintain a certain resolution as the distance z increases, the focal distance should increase. FIG. 9 is a graph showing a resolution R with respect to z and a graph showing accuracy of distance estimation using a percentage of distance. In an example shown in (a) of FIG. 9, when Δc$_y$=20, c$_z$=0, f=150, and α=0.00525 (in units of mm), an object positioned at 15 meters should move by 0.5 meters in order to move by one pixel. Accordingly, when the shifting value Δy may be estimated with an accuracy of ¼ pixel, the distance estimation achieves an accuracy of 0.125 meters. An object positioned at 45 meters should move 3.5 meters in order to move one pixel, which means needing a distance estimation having an accuracy of less than one meter in order to estimate a shifting value Δy with an accuracy of less than ¼ pixels. In (b) of FIG. 9, a graph showing an accuracy of distance estimation using a percentage of distance is shown. For example, an estimation for 50 meters has an accuracy of less than or equal to 9%, and an estimation for an object positioned at 10 meters has an accuracy of less than or equal to 2% for one pixel resolution.

The object separation unit 150 classifies the detected objects by using the eight-directional labeling method in case that a plurality of objects are detected. And the object separation unit 150 clusters the distance of each object based on the color shifting value (CSV) histogram calculated for each labeled object region and separates the overlapped objects. The object separation unit 150 clusters the overlapped objects by using the multi-modal histogram decomposition method and separates the overlapped objects by using a predetermined threshold value in the histogram.

Figure 10:
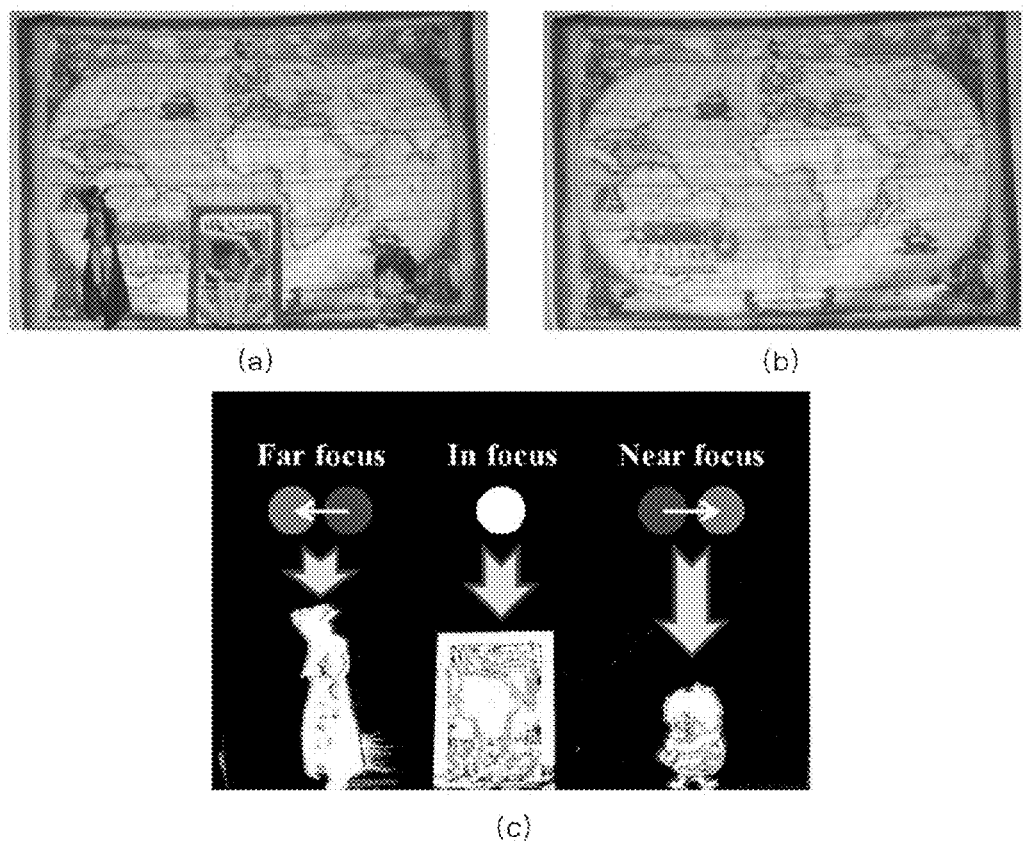
FIG. 10 is a view showing objects detected by a background subtraction method.

FIG. 10 is a view showing objects detected by a background subtraction method. As shown in (c) of FIG. 10, color shifting is occurred at a boundary of each object and the detected regions corresponding to each object are classified by using eight-directional labeling method. CSVs of the detected regions are estimated from the rectangle regions of the labeled objects by minimizing equation 3. If the estimation is performed for a single object, the histogram of CSV of the object excluding the background has a characteristic of uni-modal and CSV of the object is determined by detecting maximum probability value. However, the regions of overlapped objects have the characteristic of multi-modal and it is not possible to determine a single value of maximum probability as a distance of each region. Therefore, the distances of the overlapped objects should be clustered by analyzing the multi-modal. The general parametic based clustering method estimates the given number of parameters for the given number of cluster to be classified. But, it is impossible to know how many objects are overlapped in a real image.

Therefore, the number of clustering should be estimated from CSV histogram and the histogram should be clustered according to the estimated number of cluster. To solve the afore-mentioned problem, modality of the histogram is estimated and each object of the overlapped regions is separated by clustering the distances of the overlapped objects using the multi-modal histogram decomposition method and by applying the threshold value. The histogram decomposition method has low computational complexity since it does not employ conventional iterative parameter refinement. Furthermore, the CSV histogram is smoothed by a Gaussian filter for prevention the detection of multiple fake local minima and maxima. The predetermined number of parameters, such as means and variances, are estimated after calculating the number of clusters using the estimated local maximum and minimum in the CSV histogram. Optimal threshold values for clustering objects are estimated using a maximum-likelihood-based decision criterion from parameters in the CSV histogram for separating objects.

Hereinafter, an effect of an apparatus and method for estimating a distance using a DCA according to an embodiment of the present invention is evaluated, and an off-axis aperture image relation is analyzed. In the experiment, the Canon 12.2 megapixel DSLR camera equipped with an APS-C CMOS sensor has been used. An EF-S 18-55 mm lens available from Canon Inc. is used in a camera in order to estimate a short distance of less than 5 meters, and an AF 55-200 mm lens available from Tamron Co. Ltd. is used in order to estimate a long distance from 5 meters to 20 meters. Each of the two lenses is equipped with the DCA including both the red color filter and the cyan color filter. A size of the apertures and a distance Δc$_y$ between the apertures in addition to the camera specification are described in the following table.

TABLE 1

| CAMERA SPECIFICATION | |
|---|---|
| CAMERA TYPE | DIGITAL SINGLE LENS REFLEX (DSLR) - CANON 450D |
| IMAGE SENSOR | 22.2 × 14.8 mm APS-C CMOS SENSOR |
| RESOLUTION | 12.2 MEGAPIXEL (4272 × 2848) |

| DCA LENS SPECIFICATION | | |
|---|---|---|
| LENS TYPE | CANON EF-S 18-55 mm 3.5-5.6 | TAMRON AF 55-200 mm F4-5.6 |
| Δc$_y$ | 5 mm | 8 mm |
| DISTANCE BETWEEN APERTURES | 1 mm | 5 mm |

For short distance estimation, a white LED light is used as the object. FIG. 10 is a view showing color shift that is obtained when an object is positioned at a distance between 40 cm and 500 cm in a case in which f=50 mm and z$_0$=115 cm. When the object is closer than a focal position (z<115 cm), as shown in (a) and (b) of FIG. 10, a red channel is moved leftward with respect to a cyan channel. When the object is farther than the focal position (z>115 cm), as shown in (c) to (h) of FIG. 10, a red channel is moved rightward with respect to a cyan channel.

Figure 11:
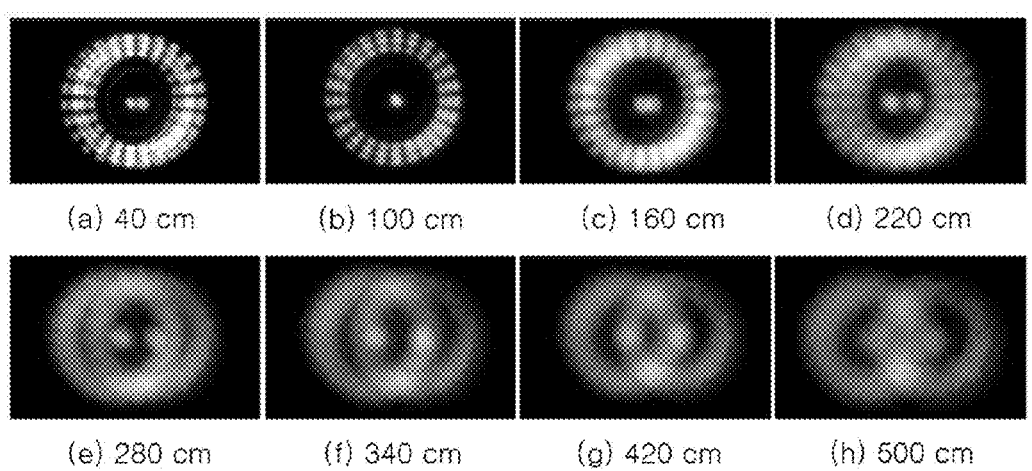
FIG. 11 is a view showing a color shift that is obtained when an object is positioned at a distance between 40 cm and 500 cm in a case in which f=50 mm and $z_0$=115 cm.
Figure 12:
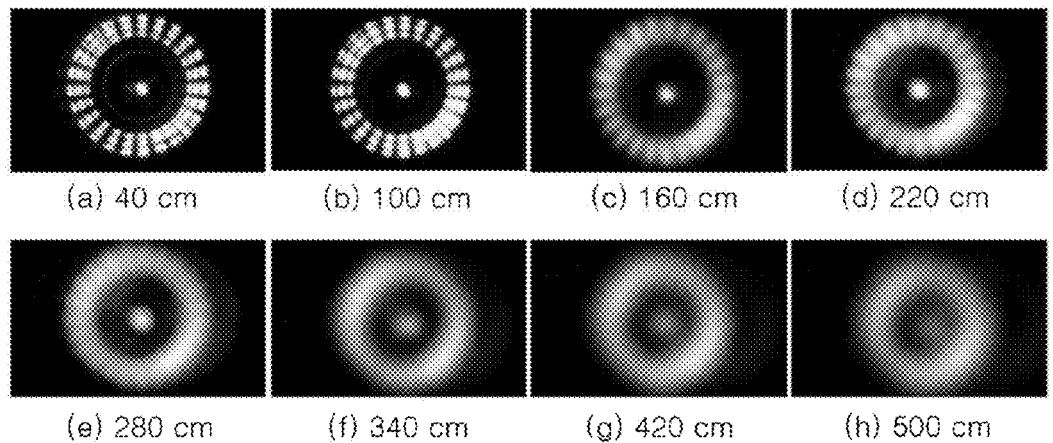
FIG. 12 is a view showing a matching result caused by color channel shift.

In order to estimate the distance of the object, the color shifting value Δy needs to be estimated. The color shifting value may be automatically obtained in various methods, but in this experiment, the color shifting value was determined by moving the red channel along the y-axis until color misalignment had disappeared. FIG. 11 is a view showing a matching result, and FIG. 12 is a graph showing a color shift value as a function of a distance according to a relation between Δy and z that are given in Equation (21). It can be seen from FIG. 12 that the experiment result and the theoretical value are significantly consistent.

Figure 13:
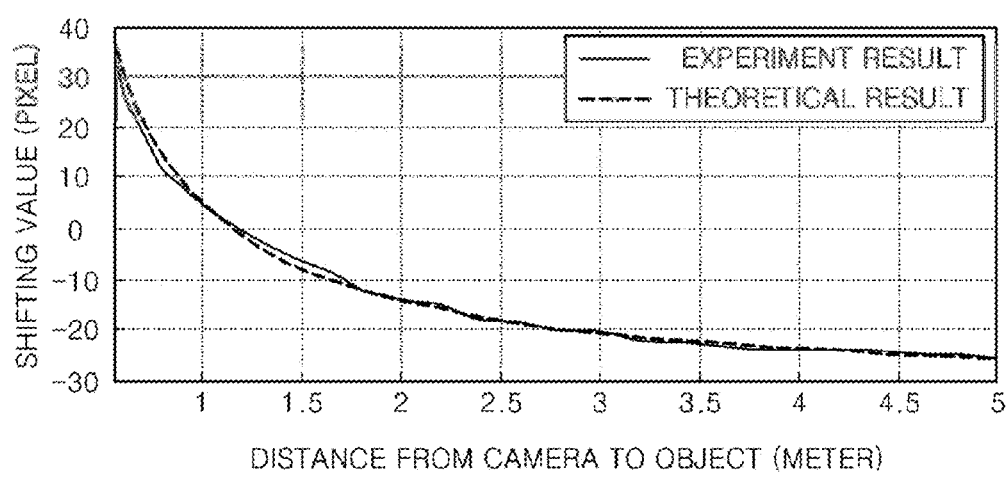
FIG. 13 is a graph showing a color shifting value as a function of a distance according to a relation between $\Delta y$ and z that are given in Equation (16)
Figure 14:
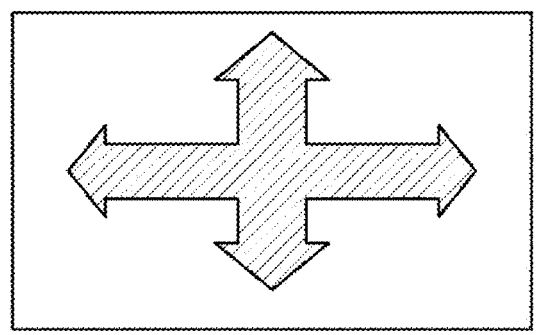
FIG. 14 is a view showing a cross pattern used in the experiment.

In order to evaluate performance of the DCA camera with respect to an object positioned at a long distance, a position of an object is changed and photographed in units of one meter from 5 meters to 30 meters using a printed cross pattern shown in FIG. 13. According to equation (27), resolution of estimating a distance with respect to a fixed focal distance decreases as the distance z increases. Accordingly, in the experiment, the Tamron AF 55-200 mm lens having a long focal distance was used. FIG. 14 is a graph of a color shifting value measured at a distance for an object having a position changed in units of one meter from 5 meters to 30 meters using a 180 mm lens. It can be seen from FIG. 14 that a value given by equation (21) is consistent with the experiment result.

Figure 15:
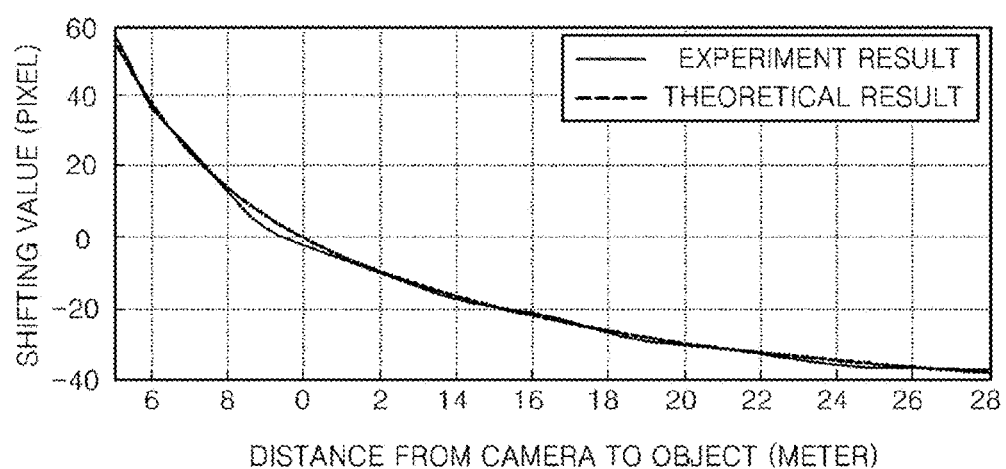
FIG. 15 is a graph of a color shifting value measured at a distance for an object having a position changed in units of one meter from 5 meters to 30 meters using a 180 mm lens.
Figure 16:
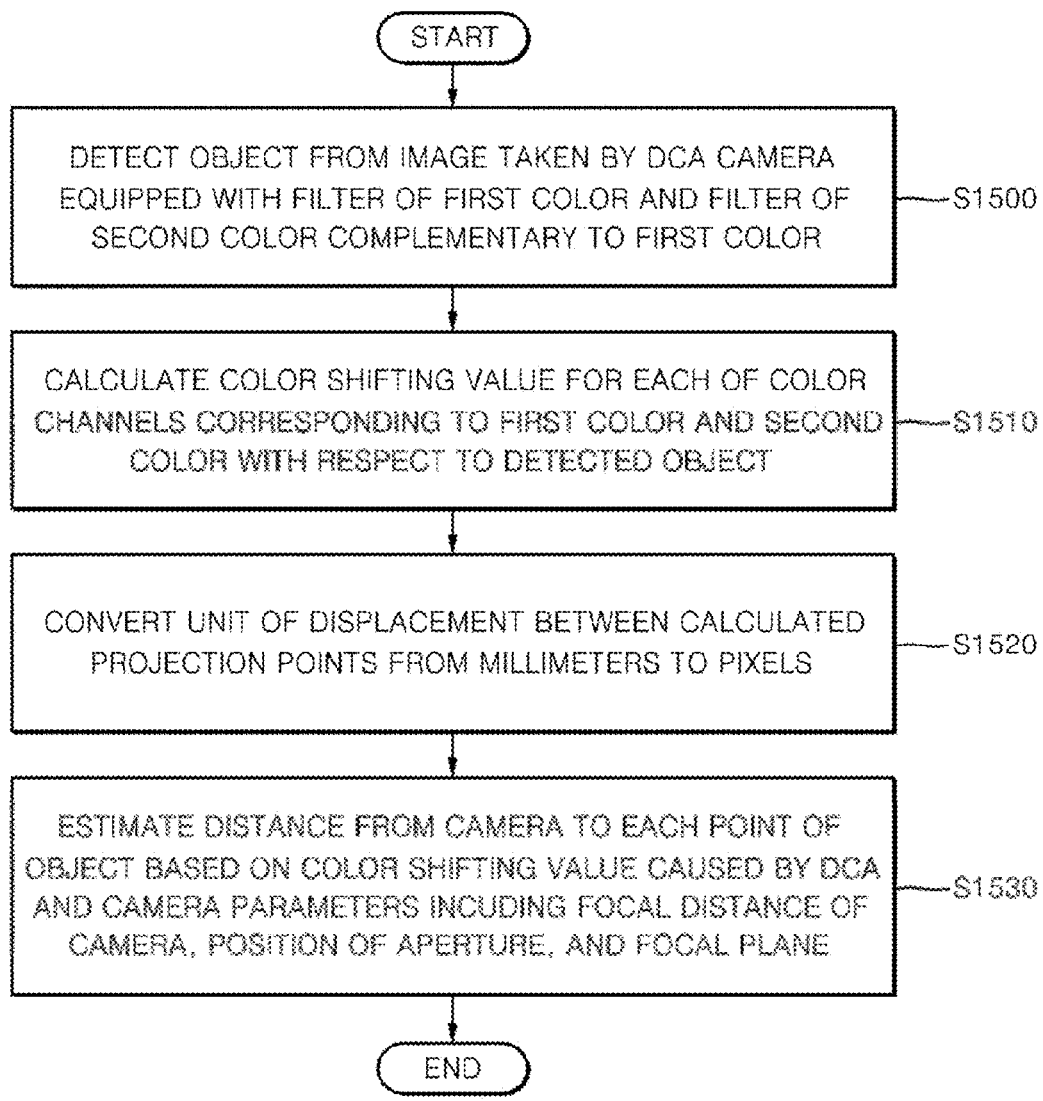
FIG. 16 is a flowchart showing a distance estimation method using a dual off-axis color filter aperture (DCA) according to an embodiment of the present invention.

FIG. 15 is a flowchart showing a distance estimation method using a dual off-axis color filter aperture (DCA) according to an embodiment of the present invention.

The object detection unit 110 detects an object from an image taken by a DCA camera equipped with a filter having a first color and a filter having a second color that is complementary to the first color in operation S1500. Next, the color shifting value calculation unit 120 calculates respective color shift values of color channels corresponding to the first color and the second color with respect to the detected object in operation S1510. The unit conversion unit 130 converts a unit of a displacement between projection points that is calculated by the color shifting value calculation unit 120 from millimeters to pixels in operation S1520. The distance estimation unit 140 estimates a distance from a camera to each point on an image plane on the basis of a color shifting value caused by the DCA and camera parameters including a focal distance of the camera, positions of the apertures, and a focal plane of the camera in operation S1530.

The invention can also be embodied as computer-readable codes on a computer-readable recording medium. The computer-readable recording medium is any data storage device that can store data which can be thereafter read by a computer system. Examples of the computer readable record medium include a ROM, a RAM, a CD-ROM, a magnetic tape, a floppy disk, and an optical data storage. Further, the record medium may be implemented in the form of a carrier wave such as Internet transmission. The computer readable recording medium can also be distributed over computer systems connected through a wired/wireless communication network so that the computer readable code is stored and executed in a distributed fashion.

According to the apparatus and method for estimating a distance using a dual off-axis color filter aperture (DCA) according to an embodiment of the present invention, it is possible to estimate a distance from a camera to each object from an image taken by a camera having the DCA with simple calculation.

While the present invention has been particularly shown and described with reference to preferred embodiments thereof, it should not be construed as being limited to the embodiments set forth herein. It will be understood by those skilled in the art that various changes in form and details may be made to the described embodiments without departing from the spirit and scope of the present invention as defined by the following claims.

What is claimed is:

1. An apparatus for estimating a distance using a dual off-axis color filter aperture (DCA), the apparatus comprising:
    an object detection unit detecting an object from an image taken by a camera having the DCA equipped with a first filter having a first color and a second filter having a second color complementary to the first color using a predetermined method;
    a color shifting value calculation unit calculating a color shifting value (CSV) using a color shift property between color channels of the image in a region corresponding to the detected object;
    a distance estimation unit estimating a distance from the camera to each point of the object based on the calculated CSV and camera parameters including a focal distance of the camera, a focal plane of the camera, and a position of the aperture; and
    when the detected object is provided in a plural number, an object separation unit labeling the detected objects using a 8-directional labeling method and clustering a depth of each object based on a histogram of the color shifting value estimated from a region of each of the labeled objects to separate multiple objects in which an overlap occurs,
    wherein the histogram is smoothed by a Guassian filter.

2. The apparatus of claim 1, wherein the color shifting value calculation unit calculates the color shifting value by a following equation:

$$\Delta y = f^2 \frac{z_0 - z}{(z_0 - f)(fz - (z-f)c_z)} \Delta c_y$$

where, $\Delta y$ is the color shifting value in units of millimeters, f is the focal distance of the camera, $z_0$ is the focal plane of the camera, z is a distance from a center of a lens to an object, $c_z$ is a distance from the lens to the DCA, and $\Delta c_y$ is a distance between two apertures.

3. The apparatus of claim 1, further comprising a unit conversion unit converting a unit of a displacement between projection points calculated by the color shifting value calculation unit based on specification information of an image sensor equipped in the camera.

4. The apparatus of claim 3, wherein the unit conversion unit calculates the color shifting value in units of pixels converted by a following equation:

$$\Delta y = \frac{f^2}{\alpha} \frac{z_0 - z}{(z_0 - f)(fz - (z-f)c_z)} \Delta c_y$$

where, $\Delta y$ is the color shifting value in units of pixel, f is the focal distance of the camera, z0 is the focal plane of the camera, z is a distance from the center of the lens to the object, cz is a distance from the lens to the DCA, $\Delta$cy is a distance between two apertures, and $\alpha$ is a distance between two pixels calculated by $$\alpha = \sqrt{\frac{W_S H}{N_1 s N_2}}$$

(where N1 and N2 are a width and height of the pixel array, respectively, and W and H are a width and height of the CMOS array).

5. The apparatus of claim 1, wherein the first color is red and the second color is cyan.

6. The apparatus of claim 1, wherein the distance estimation unit estimates the distance from the camera to each point of the object by a following equation:

$$z = f \frac{fz_0 \Delta c_y - \alpha c_z(z_0 - f)\Delta y}{f^2 \Delta c_y + \alpha(z_0 - f)(f - c_z)\Delta y}$$

where, z is a distance from the center of the lens to the object, α is a distance between two pixels obtained by a size of a pixel array equipped in the camera and a size of the CMOS array, $z_0$ is a focal plane of the camera, $c_z$ is a distance from the lens to the DCA, $\Delta c_y$ is a distance between two apertures, and $\Delta y$ is the color shifting value in units of pixels.

7. The apparatus of claim 1 wherein the object separation unit separates objects in the overlap region through a threshold, while clustering depths of the overlapping objects using a multi-modal histogram decomposition method.

8. The apparatus of claim 1, wherein the object detection unit detects an object using an optical flow method.

9. A method of estimating a distance using a dual off-axis color filter aperture (DCA), the method comprising:
  (a) detecting an object from an image taken by a camera having the DCA equipped with a first filter having a first color and a second filter having a second color complementary to the first color using a predetermined method;
  (b) calculating a color shifting value (CSV) using a color shift property between color channels of the image in a region corresponding to the detected object;
  (c) estimating a distance from the camera to each point of the object based on the calculated CSV and camera parameters including a focal distance of the camera, a focal plane of the camera, and a position of the aperture; and
  (e) when the detected object is provided in a plural number, labeling the detected objects using a 8-directional labeling method and clustering a depth of each object based on a histogram of the color shifting value estimated from a region of each of the labeled objects to separate multiple objects in which an overlap occurs, wherein the histogram is smoothed by a Gaussian filter.

10. The method of claim 9, wherein in (b), the color shifting value is calculated by a following equation:

$$\Delta y = f^2 \frac{z_0 - z}{(z_0 - f)(fz - (z - f)c_z)} \Delta c_y$$

where, $\Delta y$ is the color shifting value in units of millimeters, f is a focal distance of the camera, $z_0$ is a focal plane of the camera, z is a distance from a center of a lens to an object, $c_z$ is a distance from the lens to the DCA, and $\Delta c_y$ is a distance between two apertures.

11. The method of claim 9, further comprising (d) converting a unit of a displacement between projection points calculated by a color shifting value calculation unit based on specification information of an image sensor equipped in the camera.

12. The method of claim 11, wherein in (d), the color shifting value in units of pixels is calculated by a following equation:

$$\Delta y = \frac{f^2}{\alpha} \frac{z_0 - z}{(z_0 - f)(fz - (z - f)c_z)} \Delta c_y$$

where, $\Delta y$ is the color shifting value in units of pixel, f is the focal distance of the camera, z0 is the focal plane of the camera, z is a distance from the center of the lens to the object, cz is a distance from the lens to the DCA, $\Delta c y$ is a distance between two apertures, and α is a distance between two pixels calculated by $$\alpha = \sqrt{\frac{W_S H}{N_1 s N_2}}$$

(where N1 and N2 are a width and height of the pixel array, respectively, and W and H are a width and height of the CMOS array).

13. The method of claim 9, wherein the first color is red and the second color is cyan.

14. The method of claim 9, wherein in (c), the distance from the camera to each point of the object is estimated by a following equation:

$$z = f \frac{fz_0 \Delta c_y - \alpha c_z(z_0 - f)\Delta y}{f^2 \Delta c_y + \alpha(z_0 - f)(f - c_z)\Delta y}$$

where, z is a distance from the center of the lens to the object, α is a distance between two pixels obtained by a size of a pixel array equipped in the camera and a size of the CMOS array, $z_0$ is the focal plane of the camera, $c_z$ is a distance from the lens to the DCA, $\Delta c_y$ is a distance between two apertures, and $\Delta y$ is the color shifting value in units of pixels.

15. The method of claim 9, wherein in (e), objects are separated in the overlap region through a threshold while depths of the overlapping objects are clustered using a multi-modal histogram decomposition method.

16. The method of claim 9, wherein in (a), an object is detected using an optical flow method.

17. A non-transitory computer-readable recording medium storing a program for executing the method of estimating a distance using the dual off-axis color filter aperture (DCA) of claim 9.

* * * * *